Patented Sept. 28, 1937

2,094,367

UNITED STATES PATENT OFFICE 2,094,367

STABILIZED CARBON TETRACHLORIDE

Edmund C. Missbach, Oakland, Calif., assignor to Stauffer Chemical Company, a corporation of California No Drawing. Original application October 9, 1933, Serial No. 692,819. Divided and this application January 23, 1935, Serial No. 3,181

3 Claims. (Cl. 23—250)

This invention relates to the prevention of decomposition of halogenated hydrocarbon compounds, particularly chlorinated aliphatic hydrocarbons, and to the prevention of corrosion by these compounds. It is known that these materials when exposed to moisture, light, air, and heat, particularly during distillation, as in the case of carbon tetrachloride, decompose with the formation of substances of an objectionable character, usually acidic substances which render the material unsuitable for such purposes as extractions as well as corroding equipment. The decomposition I attribute to hydrolysis and liberation of acid or acid bodies which also catalyze the decomposition.

Examples of materials with which the present invention is concerned are carbon tetrachloride, $CCl_4$, chloroform, $CHCl_3$, trichlorethylene, $C_2HCl_3$, tetrachlorethylene, $C_2Cl_4$, pentachlorethylene, $C_2HCl_5$, and the like. Generally, it is concerned with chlorinated and brominated derivatives of methane, ethane, and higher paraffine, as well as ethylene and higher homologues thereof.

The object of this invention is to provide an effective stabilizer for chlorinated hydrocarbons which need be used only in relatively small concentrations.

Another object of this invention is to provide an effective corrosion inhibitor for use in the presence of halogenated hydrocarbons.

I have found that numerous compounds, hereinafter set forth, are effective stabilizers and corrosion inhibitors for these materials. Of course, one inhibitor may not be practical for reasons other than its corrosion inhibiting properties and. choice must be exercised to the end in view. For example, an inhibitor in carbon tetrachloride to be used in dry cleaning clothes must not deleteriously affect fabrics to be cleaned or alter the color thereof.

The corrosion inhibitor used need only be present in a relatively small concentration, usually a small fraction of 1% and compounds of relatively low solubility in the halogenated hydrocarbon have been used effectively. In some cases, where it is desired to use relatively large quantities of the inhibitor, and where the water solubility of the corrosion inhibitor is relatively greater than its solubility in the compound, the inhibitor may be introduced in the form of an aqueous solution. Such a mixture is effective particularly during distillation, by stabilizing the halogenated hydrocarbon in its liquid state as well as in the vapor phase, a sufficient amount of the inhibitor being volatile with the water vapor.

In cases where the solubility of the corrosion inhibitor in the halogenated hydrocarbon compound is relatively very small, it has been found that the efficiency of these particular inhibitors is so great, that only very small quantities of same are required to stabilize the halogenated hydrocarbon compound to the extent demanded in practice. If it is desired to apply larger proportional amounts of an inhibitor of a solid type, it is reduced to a fine powder, and suspended in the halogenated hydrocarbon, which procedure is especially advisable in case of recovering the halogenated hydrocarbon by distillation.

In some other cases, where it is desired to increase the concentration of the inhibitor above its solubility in the halogenated compound, it is dissolved in a solvent compound miscible with the halogen compound and then incorporated. As suitable solvents, I have used the following compounds: ethylal, methylal, n-butyl alcohol, n-propyl alcohol, methyl ethyl ketone, allyl alcohol, allylethyl ether, methyl carbonate, ethyl carbonate, ethyl cenanthate, beta dimethylaminoethyl alcohol, n-heptaldehyde, and polymerized castor oil. In the case of polymerized castor oil, this material appears to have a metal protecting action and reduces the rate of corrosion apparently by forming a protecting film on the metal.

In all cases, where the corrosion inhibitors mentioned are in the form of solid substances, or are liquids at atmospheric temperatures, and have boiling points considerably higher than that of the halogenated hydrocarbon, they are sufficiently volatile with the water vapor escaping together with the vapor of the halogenated hydrocarbon during distillation. They are therefore not only capable of protecting the latter in the liquid phase, but also in the vapor phase, as have been sufficiently demonstrated by accelerated corrosion tests made in behalf of these corrosion inhibitors, and conducted continuously for a period of 168 hours under reflux in the presence of water, as well as by use for several years under conditions met in practice with carbon tetrachloride.

This is a division of my parent case 692,819 filed October 9, 1933. In this case I claim the amines. The disclosure of that case is incorporated by reference here.

I have found that the amines, also called ammonia bases, will stabilize carbon tetrachloride. These are compounds in which hydrogen of ammonia is replaced by a radical, either alkyl, aryl, or alkyl-aryl. The term "ammonia base" or "ammonium base" or "substituted ammonium base"

is not used as including a double nitrogen to nitrogen linkage as in azo compounds although I do employ it as including hydroxylamines and hydrozines.

These materials include amino derivatives of normal monohydric saturated alcohols as well as those of isomeric propyl, butyl and amyl alcohols, as: primary amines ($R.NH_2$), secondary amines ($R_2.NH$), tertiary amines ($R_3.N$). As examples of these are mentioned the primary, secondary, and tertiary methyl, ethyl, n-propyl, iso-propyl, n-butyl, n-octyl, and amyl-amines, including mixed amines as methyl-propylamine, methyl-ethyl-propylamine and the like. Amino derivatives of a monobasic acid are useful as acetyl methyl amine. Amines of dihydric alcohols as hydroxy ethylamine, ethylene diamine, diethylene diamine, tetramethylene-diamine, and pentamethylene diamine, are included.

The amino derivatives of benzene and its homologues, aromatic bases—arylamines are also useful, including primary, secondary, and tertiary amines.

As primary monamines are mentioned aniline, as well as higher homologues of aniline including o-, m-, and p-toluidine, and the xylidines, mesidine, pseudo-cumidine, the methyl-, dimethyl-, ethyl-, and diethyl aniline.

Secondary monamines as pure aromatic secondary amines as diphenylamine and derivatives thereof, as well as mixed secondary bases containing both an alkyl and an aryl group as methyl-aniline, ethylaniline, and methyl diphenyl amine, are included.

Pure (triarylamines) aromatic or mixed (alkyl-aryl amines) tertiary monamines as triphenyl amine, methyl ethylaniline, benzyl phenyl hydrazine, dimethyl aniline, and diethyl aniline are included.

Polyamino derivatives, diamines, and triamines, et cetera, as phenylene-diamine, ethylidene-diphenyl diamine, p-amino-dimethyl aniline, tolylene diamine, and tetramino benzine, are included.

Formanilide, an acyl derivative of an arylamine, is also useful.

Benzylamine, mono-, di-, and tri-, mentioned as primary amines with the amino group in the side chain, are included, as well as betaphenyl ethylamine and benzyl aniline.

Amino substitution products of aldehydes and ketones are included as benzoyl formaldehyde hydrazone and acetone hydrazone and benzalazine.

Condensed benzene nuclei compounds include the naphthylamines, the several tetrahydro naphthylamines, methyl-, dimethyl-, and phenyl-amines, the naphthylene diamines.

As other ammonium bases included herein can be mentioned the hydroxylamines, as the methyl- and ethyl-hydroxylamines and hydrazines derived from diamide or hydrozine and including methyl-, ethyl-, and diethyl-hydrazine, and tetra-ethyl-tetrazine.

Aromatic hydrazines corresponding with those of the aliphatic series—these include benzyl hydrazine, phenyl hydrazine, s-diphenyl hydrazine, uns.-diphenyl hydrazine, phenyl methyl-hydrazine, and tertiary-hydrazines as triphenyl hydrazine.

Aromatic compounds containing two or more benzene nuclei as benzidine and carbazole, o-tolidine, dianisidine and dimethoxy-benzidine are included, as are amines of the diphenyl-methanes as diamino-diphenyl-methane and tetra-methyl-diamino-methane, and complex pyridine-aldehyde products as pyridine formaldehyde and other pyridine derivatives as piperidine are also useful.

The stabilizing effect and inhibiting action in corrosion of my inhibitor toward decomposition of the halogen content is, I believe, accomplished in one or all of these ways. Firstly, they neutralize or remove any acid or acidic substances present; secondly, they retard the production of acid; thirdly, they form a protective film on the surface of the metal.

This invention, however, is not limited to the use of a single substance or compound mentioned herein, or which are related to their respective class or groups, but I may also employ two or more of these substances in combination with each other, in connection with the stabilization of halogenated hydrocarbons, or I may use a substance which forms a part of certain compounds mentioned herein.

For examples I wish to mention that I may combine or use various mixtures as of alkyl-amines, hydrazines, hydroxyl-amines, or any of these substances which have a strongly basic reaction, with an arylamine, but particularly with a secondary aromatic amine.

Strongly basic substances such as aliphatic amines, hydrazines, and hydroxylamines are here included because of their ability to neutralize any acid or acidic substance present, and to retard the formation of acid. However it is understood that if these substances produce undesirable effects, they may be used in combination with other substances, as aldehydes, e. g., formaldehyde or its polymers, benzaldehyde, heptaldehyde and the like, or ketones, benzil, dibenzyl, benzoyl-acetone, or organic acids, particularly higher fatty acids, as adipic acid, abietic acid, malonic acid, palmitic acid, stearic acid, myristic acid, heptoic acid, non-ilic acid, particularly in cases in which the inhibitor has a strongly basic character.

The tests of materials hereinbefore set forth are by way of example only, and are not to be taken as limiting the invention which includes the use of all of those compounds disclosed, as inhibitors for decomposition and corrosion, as well as materials which are merely higher homologues, or derivatives, or substitution products of the disclosed inhibiting compounds.

I have previously indicated that only a small quantity of the stabilizer need be used. With materials useful herein I have used as little as 0.01 gram (0.0067%) per 150 c. c. of napthylamine and not more than 0.5 (0.34%) of this same material. These percentages indicate the order of magnitude in which the stabilizers need be used.

I claim:
1. Carbon tetrachloride containing in only a stabilizing amount napthylamine.
2. Carbon tetrachloride containing less than 1% of napthylamine.
3. Carbon tetrachloride containing about 0.34% of napthylamine.

EDMUND C. MISSBACH.